US005614325A

United States Patent [19]

Chartier et al.

[11] Patent Number: 5,614,325

[45] Date of Patent: Mar. 25, 1997

[54] COATED PAPER FOR MACHINES HAVING SHEET AND FRICTION FEED SYSTEMS

[75] Inventors: Christophe Chartier, Voiron; Alain Barthez, Paris, both of France

[73] Assignee: Arjo Wiggins Papiers Couches S.A., France

[21] Appl. No.: 424,516

[22] PCT Filed: Oct. 26, 1993

[86] PCT No.: PCT/FR93/01043

§ 371 Date: May 25, 1995

§ 102(e) Date: May 25, 1995

[87] PCT Pub. No.: WO94/12727

PCT Pub. Date: Jun. 9, 1994

[30] Foreign Application Priority Data

Nov. 26, 1992 [FR] France .................................. 92 14231

[51] Int. Cl.$^6$ ..................................................... B32B 29/00

[52] U.S. Cl. ...................... 428/537.5; 428/195; 428/211; 428/304.4; 428/307.7; 428/311.11; 428/340; 428/537.7

[58] Field of Search ................................ 428/537.5, 496, 428/491, 486, 476.8, 481, 195, 342, 211, 205, 206, 537.7, 175, 304.4, 307.7, 311.1, 340; 162/70, 135

[56] References Cited

U.S. PATENT DOCUMENTS 4,778,711 10/1988 Hosomura et al. .

FOREIGN PATENT DOCUMENTS

A-2109705 6/1993 United Kingdom .

OTHER PUBLICATIONS

*Abstract Bulletin of the Institute of Paper Chemistry,* vol. 48, No. 10, Apr. 1978, p. 1067.

*Patent Abstracts of Japan,* vol. 6, No. 252 (P–161), 1981.

*Patent Abstracts of Japan,* vol. 5, No. 188 (P–073), 1981.

*Database WPI,* Section Ch, Week 9249, Oct. 22, 1992.

*Primary Examiner*—William A. Krynski
*Attorney, Agent, or Firm*—Bacon & Thomas

[57] ABSTRACT

Paper coated on at least one side with a pigmented layer, the dry weight of the layer per side being at least 12 g/m$^2$. The sheet's surface resistivity is less than or equal to $10^{11}$ ohms at 50% relative humidity measured according to the ASTM D257-66 standard.

9 Claims, No Drawings

COATED PAPER FOR MACHINES HAVING SHEET AND FRICTION FEED SYSTEMS

The present invention relates to a coated printing paper for use in machines with sheet or friction feeds, and which paper contains a conductive substance.

More particularly, the invention can be used in the field of indirect electrophotography, which operates on the following principle: a latent electromagnetic image of the original to be reproduced is formed on a suitable surface (e.g., a copier cylinder); this image is developed by electrostatically attracting a toner to it, and the toner image (which is no longer electrically charged) is then transferred and fixed by applying pressure and/or heat to ordinary paper.

Thus, indirect electrophotography does not require the use of a special paper, while direct electrophotography and the other forms of electrographic printing use special papers on which an electrically charged latent image is formed and then developed by direct electrostatic attraction of a toner to the paper. These papers comprise an electroconductive base sheet whose purpose is to dissipate the electrostatic charges produced during these processes, and they have a dielectric coating which, in the case of direct electrophotography, is photoconductive. Such papers are called dielectric and are described, for example, by R. H. Windhager in his article "Characteristics of commercial electrographic sheets," TAPPI Printing Reprography/Testing Conf. (Atlanta) Papers, pp. 105–120 (Nov. 14–16, 1977). The invention does not concern these special dielectric papers.

There are basically two feed systems for machines that handle (e.g., print, read, or sort) paper in sheet form.

1. Suction or vacuum systems, in which the sheet is lifted from the stack of sheets by means of air suction.

2. Friction systems, in which the sheet is pulled from the stack of paper, generally by rollers in its plane. In this case, friction is produced between this sheet and the one below or above it.

The machines that use the second type of feed system are the indirect electrophotographic printing systems, e.g., photocopiers, printers such as laser-beam printers, some labellers, and check reader-sorters.

With these machines, the utilization of coated sheets results in jamming and/or poor-quality or off-center reproductions due in particular to poor separation of the sheets stacked in the feed trays of the machines. Thus, the problem occurs during paper feed.

This separation problem becomes worse as the sheet feed rate increases.

The separation problem also becomes worse when the coated paper is glossy.

To date, only noncoated papers have been used for photocopiers or laser printers because machine-makers in the field of indirect electrophotographic reproduction advise their customers against the use of coated paper, which separates poorly, especially in machines with high-speed feeds averaging at least 50 sheets per minute (currently, some photocopiers can produce on the order of 135 copies per minute).

U.S. Pat. No. 4,778,711, filed on a priority basis in 1986, already contemplates providing coated paper for indirect electrophotographic printing machines and proposes, in particular, to solve the separation problem by recommending that the standard deviation of the coefficients of static friction of the sheets be less than or equal to 0.05.

It also states that the surface resistivity of the coated sheet must be at least $8\times10^8$ ohms for a relative humidity of 85 percent at 20° C. and that, consequently, it is necessary to use coating pigments with high surface resistivity.

Thus, this document will not lead the specialist to decrease the surface resistivity of the sheet; quite to the contrary.

Furthermore, in this patent, separation is considered acceptable if jamming problems occur with not more than 5 sheets in a stack of 1,000, even though in practice the minimum acceptable jamming rate is 1 sheet per 5,000 and the preferred rate, 1 sheet per 20,000.

Secondly, for noncoated papers, attention has already been given to machinability problems, and it has been recommended that conductive substances be used to solve them. However, these problems are in fact different from those addressed by the applicant.

These problems are described in U.S. Pat. Nos. 3,933,489 and 3,884,685. In U.S. Pat. No. 3,933,489, the problem of machinability takes place in electrostatic reproduction machines. When sheets move into the high-temperature areas, the moisture normally present in the paper evaporates, causing the paper's conductivity to drop sharply. Consequently, the electric charges generated by the electrostatic process accumulate on the sheet and cannot be dissipated because the paper is not sufficiently conductive.

To solve this problem, the surface of the sheet is treated with conductive substances which cause the conductivity of the paper to vary only slightly with the relative humidity level, in particular at low levels.

In U.S. Pat. No. 3,884,685, the problem of machinability is tied to the incorporation of hollow plastic spheres in the body of the paper, which makes it weakly conductive because conventional plastics are notoriously nonconductive. This explains why, during paper feed, the sheets remain stuck together by the electrostatic charges, which cannot be dissipated through the sheets. It is thus seen to be necessary to treat the sheets with a conductive substance.

Since at least 1986, there has been an interest in using coated paper in indirect electrophotographic printing systems with sheet and friction feeds, but no solution has been found to the separation problems which they pose. Thus, the need persists among users of machines that feed sheets of paper by means of a friction system, and in particular users of printers utilizing indirect electrophotography, to be able to employ coated papers, including so-called "modem" coated papers, which have a coating weight of at least 12 g/m$^2$ per side and offer the advantage of a luxurious appearance. For example, after offset printing, they can also be personalized by the user by means of original electrophotographic prints.

This is a growing need, because users want faster and faster machines and at the same time prefer glossy papers.

Thus, one object of the present invention is to provide a coated paper with a coating weight on at least one side of at least 12 g/m$^2$ and good separation in the sheet and friction feed systems of machines handling sheet paper.

Another object is to provide a modem coated paper with good separation in sheet or friction feed systems operating at high speed, that is, handling not less than around 50 sheets per minute.

A further object is to provide a modem coated paper that is glossy and has good separation in sheet and friction feed systems, including those operating at high speed.

The applicant has found, surprisingly, that the objectives of the invention can be achieved by adding a conductive substance to the coating deposited on the paper.

The prior art in the field of paper for indirect electrophotographic printing could not lead the specialist to add a conductive substance to the coating in order to solve the machinability problems observed during paper feed.

It has been shown above that the problems of machinability that led the specialist to treat a paper with a conductive substance were very different from the one that the applicant proposes to solve and that, on the contrary, high surface resistivity was recommended for a coated paper.

Furthermore, noncoated papers currently suitable for indirect electrophotographic reproduction, such as those marketed by the applicant under the brand names OPALE de RIVES and REPRO 2000, have surface resistivities on the order of $10^{12}$ ohms and $3\times10^{11}$ ohms, respectively, measured according to ASTM D257-66 at a relative humidity of 50 percent; their coefficients of static friction are 0.95 and 0.82, respectively, and their coefficients of dynamic friction are 0.62 and 0.58, respectively, measured according to the method described in Example 1 below.

A specimen coated paper with the same composition as the paper according to the invention minus the conductive substance has a surface resistivity of around $3\times10^{12}$ ohms and coefficients of static and dynamic friction of 0.55 and 0.40, respectively, as indicated in comparative Example 1 below.

It should be recalled that the coefficient of static friction characterizes the force necessary to set in motion a sheet placed on another sheet of the same kind, and the coefficient of dynamic friction corresponds to the force required to maintain this motion while the sheet in question is in constant contact with the other sheet.

Since the coefficients of friction of the papers that do not present separation problems in printer (or photocopier) paper feeds are markedly higher than that of the specimen coated paper and since, furthermore, the conductivity of the three papers is similar, the specialist cannot arrive at a clear explanation of the problem that makes the solution obvious. In particular, he has no reason to believe either that there may be too much friction between the sheets, so that electrostatic charges are generated by friction, or that, if electrostatic charges are generated in an nonobvious way, they cannot be dissipated.

Thus, the specialist is not led to add a conductive substance to the coating in order to eliminate the separation problems which coated papers present during paper feed.

Thus, the invention provides a coated printing paper that is nondielectric, usable in sheet and friction feed machines, coated on at least one side with a pigmented coating having a dry coating weight per side of at least 12 g/m$^2$, wherein said pigmented coating contains at least one conductive substance and wherein the surface resistivity of the coated side or sides is less than or equal to $10^{11}$ ohms measured according to ASTM D257-66 at a relative humidity of 50 percent.

In a specific embodiment of the invention, the conductive substance is anionic or neutral.

Because the substances currently used to coat printing paper are anionic, it is necessary to select conductive substances that are ionicly compatible with these pigments.

Preferably, the conductive substances are selected from among the sulfonated polystyrene salts or the nitrate salts.

More specifically, the conductive substance is a sodium salt of a highly sulfonated polystyrene.

In a specific embodiment of the invention, the coated side or sides of the paper have a gloss greater than or equal to 50, by determination of gloss at 75 degrees according to TAPPI 480 om-90.

For the paper to be usable in various applications, it is preferable that the conductivity not be too high, so that the coated side or sides will print correctly regardless of the printing method used.

Thus, in a specific embodiment, the sheet according to the invention contains a conductive substance such that the coated side or sides of the sheet have a surface resistivity of between $10^8$ and $10^{11}$ ohms measured according to ASTM D257-66 at a relative humidity of 50 percent.

Preferably, the coated paper according to the invention has a moisture content of less than 5 percent in order to avoid problems with the blistering of the pigmented coating.

Moreover, it is preferable for the paper according to the invention to have a porosity, measured according to NFQ 03-075, of between around $10^{-2}$ and $8\times10^{-2}$ cm$^3$/m$^2$.Pa.s.

The invention also relates to the use of coated paper in indirect electrophotographic printing machines with sheet and friction feeds that can handle not less than around 50 sheets per minute.

The paper is cellulose-fiber-based; it may contain organic synthetic fibers or mineral fibers. It may also contain fillers and other additives customarily used in paper-making.

Preferably, the coated paper according to the invention has a base weight of at least 100 g/m$^2$.

The coating consists of at least one binder, one or a mixture of fillers customarily used for pigmented coatings, and a conductive substance. It may also contain additives used in coatings such as optical bluers, lubricants, etc.

In a specific embodiment of the invention, the paper is coated on both sides.

The coating is deposited on the base by any coating means used in paper-making, such as air-knife coaters, trailing blade coaters, etc.

The invention can be better understood with the help of following examples, for which the surface resistivities have been determined in accordance with ASTM D257-66.

COMPARATIVE EXAMPLE 1

A wood-free base paper with a base weight of 102 g/m$^2$ is coated on both sides using a trailing blade device. The coating has the following composition (dry weight):

| | |
|---|---|
| Calcium carbonate/kaolin | 80 parts/20 parts |
| Styrene-rich styrene-butadiene latex | 9 parts |
| Additives (optical bluer, lubricant) | 2 parts |

The coating deposited on each side has a dry weight of 15 g/m$^2$.

The total moisture content of the paper is adjusted to 4.5 percent.

The coated paper is calendered to make it glossy; it has a gloss of 75.

Each side has an average surface resistivity of $5\times10^{12}$ ohms at a relative humidity of 50 percent.

At a relative humidity of 15 percent, the average surface resistivity is $36\times10^{12}$ ohms, and at a relative humidity of 90 percent, it is $12\times10^8$ ohms.

The coefficients of static and dynamic friction are 0.55 and 0.40, respectively.

The Kodak rigidity is 0.80 mN/m.

The porosity is $1.6\times10^{-2}$ cm$^3$/m$^2$.Pa.s.

The air permeability (Gurley porosity), measured according to ISO 5636, is greater than 5,000 seconds.

This paper is cut into A4 sheets (21×29.7 cm). A stack of sheets is placed in the feed tray of a high-speed (50-copy-per-minute) photocopier. Separation problems occur as soon the paper begins feeding, with several sheets sticking together as they are pulled into the machine.

Note: The following method is used to measure the coefficients of friction:

The test sheet is attached to the bottom of a block using double-sided adhesive tape. The block measures 6.35 cm on a side and weighs 200 g. The unit is placed sheet-to-sheet on top of another sheet of the same kind as the one being tested.

Using a suitable apparatus, the block is dragged at a speed of 200 mm/min. The static force (when motion begins) and the dynamic force (during motion) are measured, and the static and dynamic coefficients are calculated using the following equation:

measured force (in Newtons)/[mass of the block (in kilograms)×g] where $g=9.81\ m/s^2$

EXAMPLE 2

The paper is made with the same base paper and same coating composition as in Example 1, except that a conductive substance is added to the coating composition, in this case six parts of the sodium salt of a highly sulfonated polystyrene (dry weight).

As in Example 1, the coating deposited on each side has a dry weight of 15 $g/m^2$, and the total moisture content of the paper is adjusted to 4.5 percent.

The paper is calendered as in Example 1.

Determination of characteristics and testing are the same as in Example 1.

Each side has an average surface resistivity of $3\times10^{10}$ ohms at a relative humidity of 50 percent.

At a relative humidity of 15 percent, the average surface resistivity is $10^{12}$ ohms, and at a relative humidity of 90 percent, it is $8\times10^7$ ohms.

The coefficients of static and dynamic friction are 0.51 and 0.36, respectively, or very similar to those of the specimen coated paper in Example 1.

The Kodak rigidity, porosity, and air permeability are the same as for the specimen coated paper. It has a gloss of 70.

This paper is cut into A4 sheets (21×29.7 cm). A stack of sheets is placed in the feed tray of a high-speed (50-copy-per-minute) photocopier.

When the paper begins feeding, there are none of the separation problems noted with the specimen paper; separation is a problem for less than 1 sheet per 5,000, which is an acceptable rate in the printing industry.

Furthermore, paper going into the machine does not cause jamming (less than 1 per 5,000 sheets) in either one-sided or two-sided applications.

The same good results are obtained when the paper is tested in a photocopier operating at a speed of 135 copies per minute.

When the paper according to the invention is printed on a high-speed laser printer, the same good results are obtained.

Moreover, four-color offset printing is possible with this paper. It can thus be preprinted using the offset process and then personalized by means of electrophotographic printing.

EXAMPLE 3

The paper is made with the same base paper and same coating composition as in Example 1, except that a conductive substance is added to the coating composition, in this case seven parts of sodium nitrate (dry weight).

As in Example 1, the coating deposited on each side has a dry weight of 15 $g/m^2$, and the total moisture content of the paper is adjusted to 4.5 percent.

The paper is calendered as in Example 1.

Determination of characteristics and testing are as in Example 1.

Each side has an average surface resistivity of $7\times10^9$ ohms at a relative humidity of 50 percent.

At a relative humidity of 15 percent, the average surface resistivity is $3.4\times10^{12}$ ohms, and at a relative humidity of 90 percent, it is $1.2\times10^8$ ohms.

The coefficients of static and dynamic friction are 0.48 and 0.30, respectively, or very similar to those of the specimen coated paper in Example 1.

The Kodak rigidity, porosity, and air permeability are the same as for the specimen coated paper.

This paper is cut into A4 sheets (21×29.7 cm). A stack of sheets is placed in the feed tray of a high-speed (50-copy-per-minute) photocopier.

When the paper begins feeding, there are none of the separation problems noted with the specimen paper; separation is a problem for less than 1 sheet per 5,000, which is an acceptable rate in the printing industry.

Furthermore, paper going into the machine does not cause jamming (less than 1 sheet per 5,000) in either one-sided or two-sided applications.

The same good results are obtained when the paper is tested in a photocopier operating at a speed of 135 copies per minute.

When this paper according to the invention is printed on a high-speed laser printer, the same good results are obtained.

EXAMPLE 4

The coated paper is the same as in Example 2, except that it is not calendered so that it will remain matte.

Determination of characteristics and testing are as in Example 2.

The surface resistivities are of the same order of magnitude as in Example 2.

The coefficients of static and dynamic friction are 0.64 and 0.45, respectively.

As in Example 2, excellent sheet separation is obtained.

We claim:

1. A coated printing paper that is nondielectric, usable in sheet and friction feed machines, coated on at least one side with a pigmented coating having a dry coating weight per side of at least 12 $g/m^2$, wherein said pigmented coating contains at least one conductive substance and wherein the surface resistivity measured according to ASTM D257-66 is less than or equal to $10^{11}$ ohms at a relative humidity of 50 percent.

2. A paper according to claim 1, wherein the conductive substance is anionic or neutral.

3. A paper according to claim 2, wherein the conductive substance is selected from among the sulfonated polystyrene salts or the nitrate salts.

4. A paper according to claim 3, wherein the salt is the sodium salt of a highly sulfonated polystyrene.

5. A paper according to claim 1, wherein the coated side or sides have a gloss of more than 50, measured by determination of gloss at 75 degrees in conformity with TAPPI 480 om-90.

6. A paper according to claim 1, wherein the coated side or sides have a surface resistivity measured according to ASTM D257-66 of between $10^8$ and $10^{11}$ ohms at a relative humidity of 50 percent.

7. A paper according to claim 1, wherein the moisture content is less than 5 percent.

8. A coated paper according to claim 1, wherein the porosity measured according to NFQ 03-075 is between around $10^{-2}$ and $8\times10^{-2}$ $cm^3/m^2$ $cm^3/m^2$.Pa.s.

9. In an indirect electrophotographic printing process which comprises friction feeding paper into an electrophotographic printing machine for uncoated paper and capable of handling a minimum of around 50 sheets per minute, wherein the improvement comprises friction feeding a coated printing paper according to claim 1, said paper being sized for friction feeding into said electro photographic printing machine.

* * * * *